Figure 1:
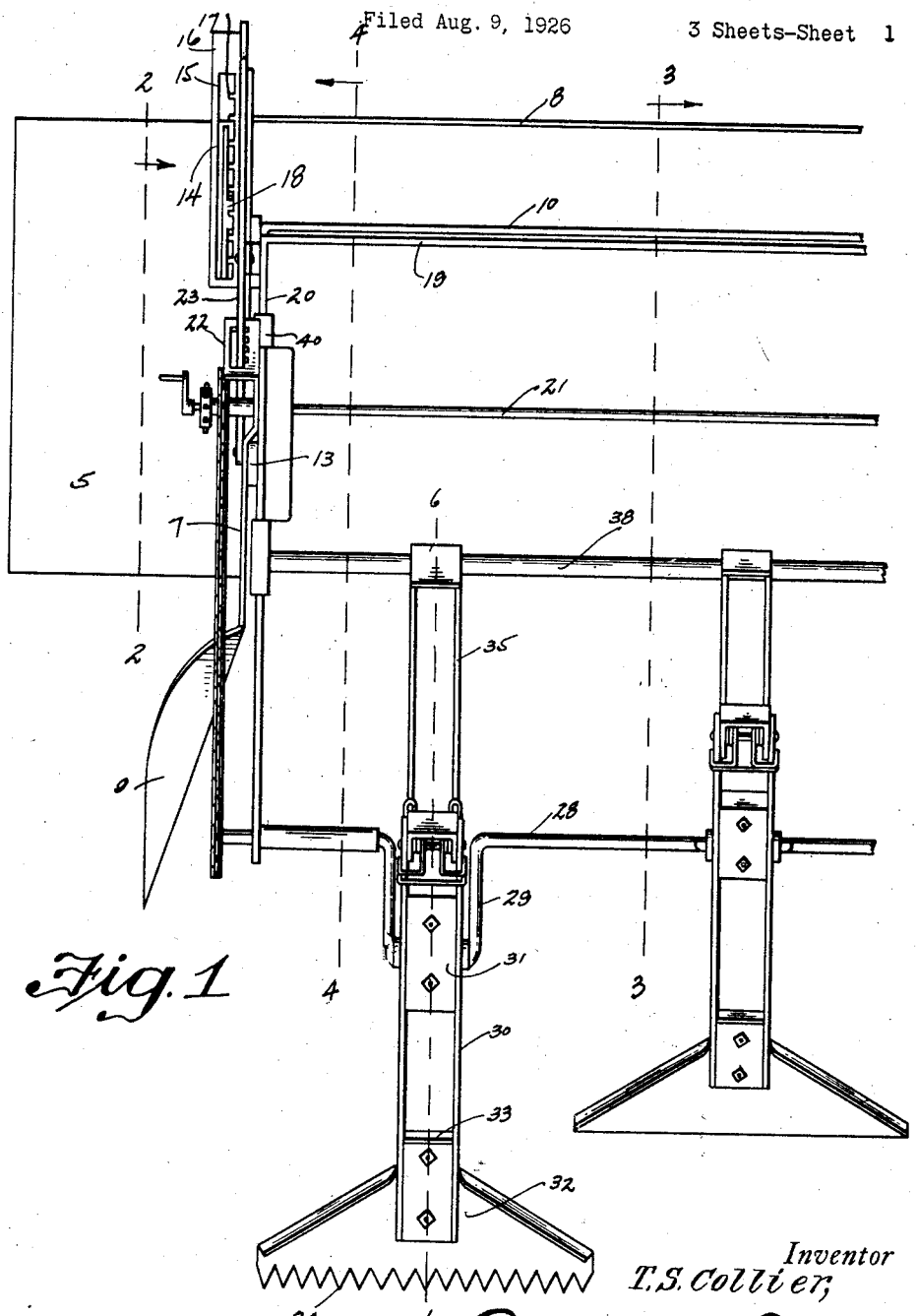

June 19, 1928.

T. S. COLLIER 1,674,158

GRAIN REEL

Filed Aug. 9, 1926    3 Sheets-Sheet 1

Inventor
T. S. Collier,
By Clarence A. O'Brien
Attorney

June 19, 1928.

T. S. COLLIER 1,674,158

GRAIN REEL

Filed Aug. 9, 1926

3 Sheets-Sheet 2

Inventor
T. S. Collier,
By Clarence A. O'Brien
Attorney

June 19, 1928.
T. S. COLLIER
1,674,158
GRAIN REEL
Filed Aug. 9, 1926
3 Sheets-Sheet 3
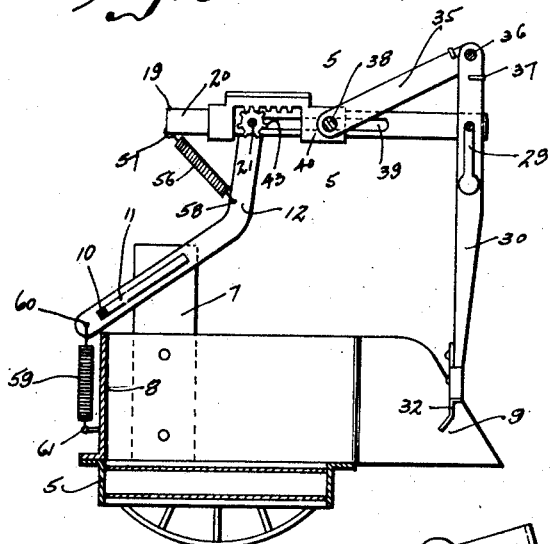
Fig. 3.
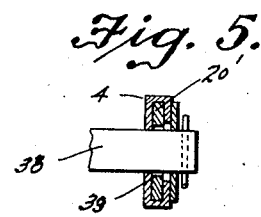
Fig. 5.
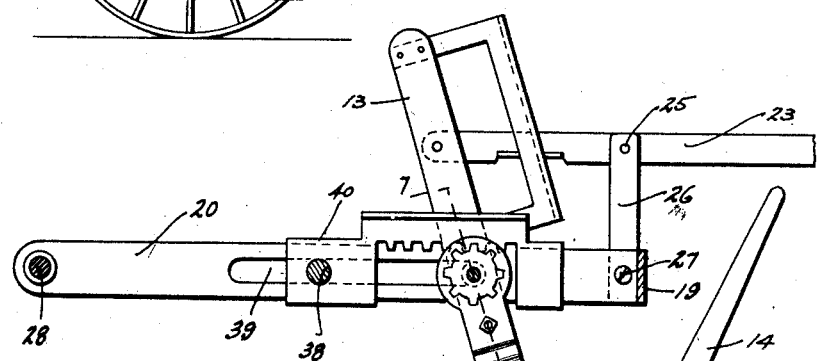
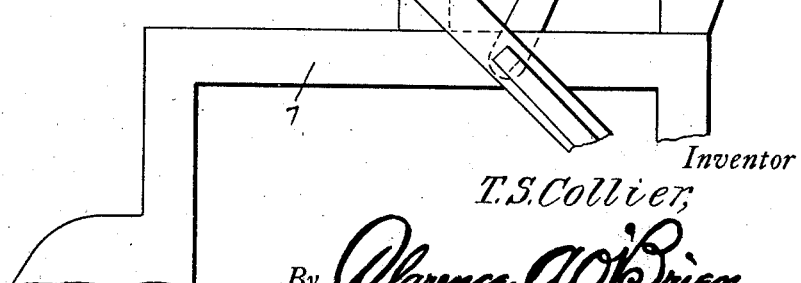
Fig. 4.
Inventor
T. S. Collier,
By Clarence A. O'Brien
Attorney Patented June 19, 1928.

1,674,158

UNITED STATES PATENT OFFICE.

THOMAS S. COLLIER, OF HYDRO, OKLAHOMA.

GRAIN REEL.

Application filed August 9, 1926. Serial No. 128,183.

The present invention relates to grain reels for grain binders and combined harvesters and binders, and the like.

An important object of the invention lies in the provision of a reel which will be effective and efficient in reeling grain which is leaning considerably or actually lying on the ground.

Another very important object of the invention resides in the provision of a reel of this nature with a plurality of important adjustments whereby the reel may be accommodated to the condition of the crops being gathered or reeled thereby.

A still further very important object of the invention lies in the provision of a reel of this nature with a plurality of gathering hands or rakes, mounted so that they move upwardly and forwardly, then downwardly and rearwardly, and because of the adjustments mentioned above, the orbits of said hands or rakes may be situated in relation to the ground so that the reel will operate properly under practically all conceivable conditions.

A further very important object of the invention resides in the provision of a device of this nature with an exceedingly simple construction, one which is capable of being manipulated in its numerous adjustments, very easily and quickly, one which possesses a compact and convenient arrangement of parts, one which is thoroughly reliable in its operation, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:—

Figure 2:
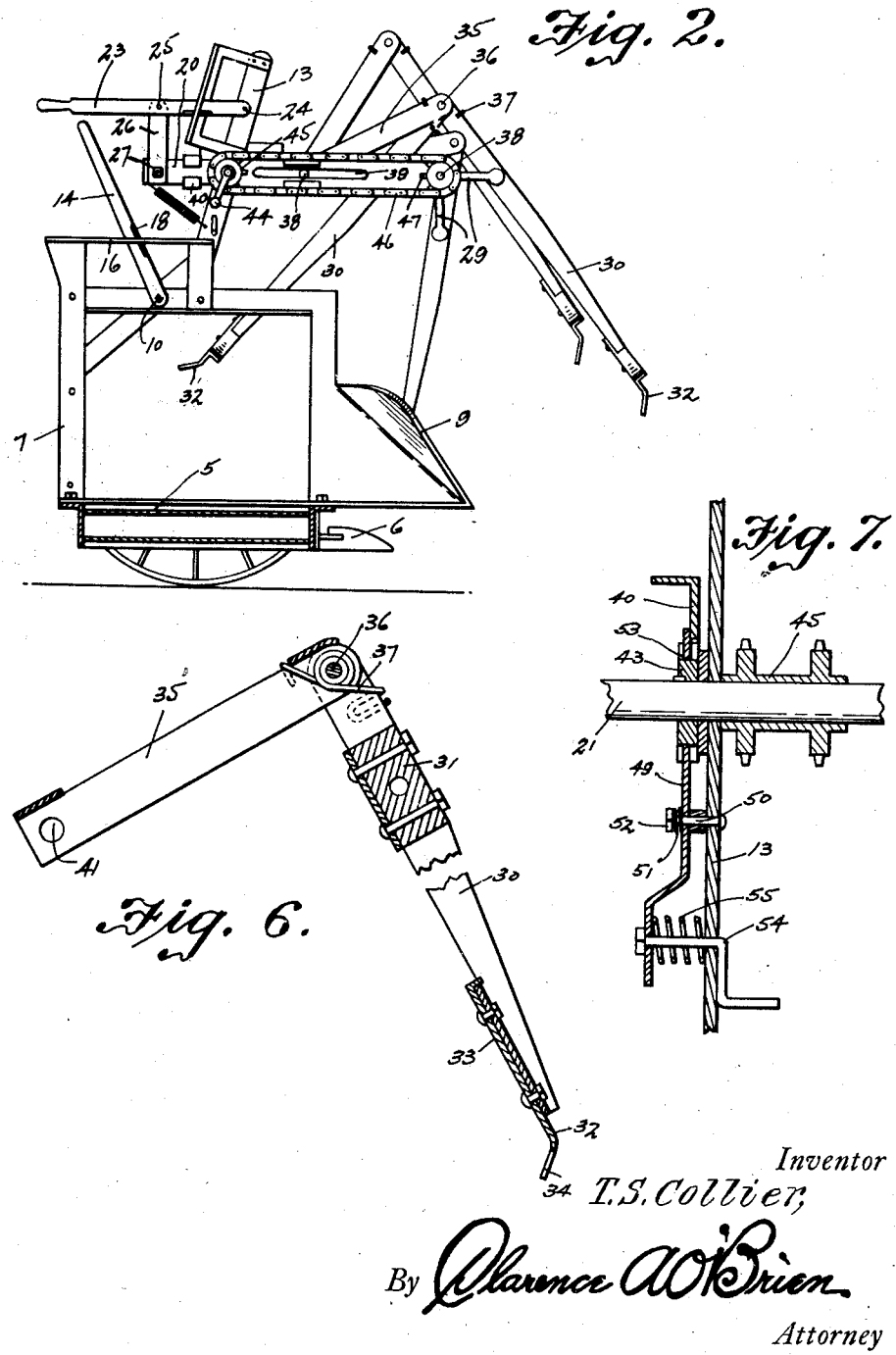

Figure 1 is a fragmentary top plan view of the grain reel embodying the features of my invention, showing particularly one end thereof, Fig. 2 is a sectional view taken substantially on the line 2—2 of Fig. 1, looking in the direction of the arrow, Fig. 3 is a similar section taken on the line 3—3 of Fig. 1, Fig. 4 is a section taken on the line 4—4 of Fig. 1, looking in the direction of the arrow, Fig. 5 is an enlarged detail section taken substantially on the line 5—5 of Fig. 3, Fig. 6 is a detail section through one of the gathering improvements taken substantially on the line 6—6 of Fig. 1, and Fig. 7 is an enlarged detail section taken substantially on the line 7—7 of Fig. 4.

Referring to the drawing in detail, it will be seen that the numeral 5 denotes a platform of any preferred construction having associated therewith at its forward portion in the usual manner, a cutting mechanism 6, of any preferred construction. End frame members 7 rise from the platform and are connected at their rear ends by a plate 8. Guide fenders 9 are formed at the forward ends of the frames 7. The structure thus far described forms only an incidental part of the present invention, and may be varied to suit the particular apparatus with which the reeling about to be described, is to be used.

A rod 10 is provided with right angularly extending end portions 11, the terminals of which are fixed to intermediate portions of arms 12 and 13 and journaled through ends 7. A crank 14 is fixed to one end of the rod 10 and is movable in a slot 15 provided in the guide 16 with which is provided teeth 17, projecting into the slot for cooperation with a projection 18 on the crank. By the adjustment, therefore, of the crank 14, the arms 12 and 13 may be swung to extend at different angles to the vertical.

A U-shaped reel frame 19 has its sides 20 pierced by a shaft 21 which also pierces the upper end of the arm 12 and a portion of the arm 13 adjacent its upper end, it being noted that the arm 13 is longer than the arm 12. On the upper portion of the arm 13, above the shaft 21, there is mounted a rack guide frame 22 through which extends a lever 23 pivoted to the arm 13 as at 24, see Fig. 2, and having an intermediate portion pivoted as at 25 to a link 26 which is pivotally engaged as at 27 with one side 20 of the U-shaped reel frame 19 adjacent the bight portion thereof.

It will thus be seen that by adjusting this lever 23, the reel frame 19 may be changed to different angular positions in relation to the arms 12 and 13. A crank shaft 28 is journaled in the extremities of the sides 20 of the reel frame 19 and includes a plurality of crank portions 29. On each crank portion 29, there is mounted a gatherer or reeling element which includes a shank formed by a pair of spaced parallel sides 30 attached intermediate their ends to a bearing block 31 for receiving the crank portion 29.

A hand or rake 32 is formed with a shank 33 which is attached between the extremities of the sides 30. The hand or rake 32 is substantially fan-shaped having a series of angularly disposed teeth 4 on the outer edge thereof. A link 35 is pivotally engaged with the other extremities of the sides 30 by a pivot pin 36 which has disposed thereabout a spring 37, the extremities of which engage the link and the sides 30 respectively for normally holding the shank of the gathering elements at substantial right angles to the link, as is clearly shown in Fig. 6.

A shaft 38 has its extremities projecting thru slots 39 in the intermediate portions of the sides 20 of frame 19, and piercing openings provided in racks 40 slidable on said sides 20. The links 35 are pivotally engaged on said shaft 38, said shaft 38 piercing openings 41 in the extremities of said links 35. The shaft 21 has fixed thereto a pair of gears 43 meshing with the racks 40. One end of this shaft terminates in a crank 44 and by rotating this crank 44, it will be seen that the racks 40 may be moved rearwardly or forwardly for adjusting the shaft 38 in relation to the crank shaft 28. A combined beveled gear and sprocket 45 is journaled on one end of the shaft 21 adjacent the crank 44 and has a chain 46 trained thereover which is also trained over a sprocket 47 fixed to the crank shaft 28. The combined beveled gear and sprocket 45 is driven in any suitable manner for causing rotation of the crank shaft 28 through the intermediacy of the chain 46 and sprocket 47.

As illustrated in Fig. 2, the crank shaft 28 rotates in a clockwise direction, and therefore the gathering hands or rakes are caused to move in substantial elliptical orbits, it being noted that the farther the shaft 38 is spaced from the shaft 28, the farther forwardly, it will reach the hands or rakes in their travels. A dog 49 is rockable intermediate its ends on a bolt 50 extending thru the arm 13, by means of a spring 51 and nuts 52, and is provided with an opening 53 engaging the gear 43 on shaft 21 so as to prevent the turning of said gear.

A bolt 54 is slidable through the arm 13 and engages the other extremity of the dog 49, and a spring 55 impinges against said dog 49 and against the arm 13 and is disposed about the bolt 54. It will thus be seen that by pulling on the bolt 54, the spring 55 may be compressed and the dog 49 rocked to disengage from the gear 43.

In order to assist in the balancing of the various parts of this contrivance, I provide a pair of springs 56 attached to the bight portion of the U-shaped reel frame 19 as at 57 to intermediate portions of the arms 12 and 13 as at 58 and additional springs 59 are engaged as at 60 with the lower extremities of the arms 12 and 13 and with members 61 projecting rearwardly from the plate 8.

It is thought that the construction, operation, and advantages of this invention will now be clearly understood without a more detailed description thereof. It is desired, however, to point out because of the numerous adjustments provided in the contrivance, that it is adaptable to meet practically all circumstances which will be encountered in gathering crops, such as grain. The various adjustments may be easily and quickly manipulated and the parts are arranged in an exceedingly compact and convenient manner. In actual operation, the device has proven very effective, efficient, and reliable.

The present embodiment of the invention has however, been disclosed merely by way of example, since in actual practice it attains the features of advantage enumerated as desirable in the statement of the invention and the above description. Numerous changes in the details of construction, and in the combination and arrangement of parts may be resorted to without departing from the spirit or scope of the invention as hereinafter claimed, or sacrificing any of its advantages.

Having thus described my invention what I claim as new is:—

1. A grain reel of the class described including, in combination, a supporting structure, a rod journaled in the supporting structure, a crank on the rod for rocking the same, a pair of arms having intermediate portions fixed to the rod, springs engaged with one extremity of each of the arms, and the supporting structure for holding normally said arms in a predetermined position, and forming a counter-balance therefor, a U-shaped frame, a shaft piercing openings in the sides of the U-shaped frame, and openings in the upper portions of the arms, a lever pivoted to one of the arms, a link pivoted to the lever and the frame, a rack member slidable on each side of the frame, gears on the shaft meshing with the rack members, a dog engageable with one of said gears for preventing accidental rotation thereof, a shaft journaled in said rack members, a crank shaft journaled in the ends of the sides of the frame, a plurality of shanks, one journaled intermediate its ends on each crank of the crank shaft, rake elements on the shanks, links pivoted on the second shaft and pivoted to the shanks, springs engaged with the shanks and links just mentioned to normally hold the shanks at predetermined angles thereto, and means for rotating the crank shaft.

2. A grain reel of the class described including, in combination, a supporting structure, a pair of arms pivoted to the supporting structure, means for adjusting the angles of the arms in relation to the supporting structure, a U-shaped frame, a shaft piercing openings in the sides of the U-shaped frame and openings in the upper portions of the arms, a lever pivoted to one of the arms, a link pivoted to the lever and the frame whereby the angle of the U-shaped frame may be varied in relation to the arms, a rack member slidable on each side of the frame, gears on the shaft meshing with the rack members, means for rotating the shafts for sliding the rack members, a dog engageable with one of said gears for normally preventing the rotation of the shaft, a shaft journaled in said rack member, a crank shaft journaled in the end sides of the frame, a plurality of shanks, one journaled intermediate its ends on each crank of the crank shaft, links pivoted on the second shaft and pivoted to the shanks, springs engaged with the shanks and links just mentioned to hold said shanks at predetermined angles thereto, and means for rotating the crank shafts.

3. A grain reel of the class described including, in combination, a supporting structure, a pair of arms having their intermediate portions pivoted in said supporting structure, counter-balanced springs associated with the lower ends of the arms and the supporting structure, a U-shaped frame, a shaft piercing openings in the sides of the U-shaped frame and openings in the upper portions of the arms, means for rotating the shaft, a lever pivoted to the arms, a link pivoted to the lever and the frame whereby the frame may be adjusted angularly in relation to the arms by swinging the lever, rack members slidable on the sides of the frame, gears on the shaft meshing with the rack members, whereby the rotation of the shaft will cause the rack member to slide longitudinally on the sides of the frame, a shaft journaled in said rack members, a crank shaft journaled in the ends of the sides of the frame, a plurality of shanks, one journaled intermediate its ends on each crank of the crank shaft, rack elements on the shanks, links pivoted on the second shaft and pivoted to the shank, a sprocket on the crank shaft, a sprocket rotatably mounted on the first mentioned shaft, a chain trained over said sprockets, and means for rotating the first sprockets.

4. A grain reel of the class described including in combination, a supporting structure, a rod journaled in the supporting structure, a crank on the rod for rocking the same, a pair of arms having intermediate portions fixed to the rod, springs engaged with one extremity of the arms, and the supporting structure for counter-balancing said arms, a U-shaped frame, a shaft piercing openings in the sides of the U-shaped frame, and openings in the upper portions of the arms, a lever pivoted to one of the arms, a link pivoted to the lever and the frame whereby the frame may be adjusted in the arms by manipulation of the lever, a rack member slidable on each side of the frame, gears on the shaft meshing with the rack members, a shaft journaled in said rack member, a crank shaft journaled in the ends of the sides of the frame, a plurality of shanks, one journaled intermediate its ends on each crank of the crank shaft, rake elements on the shanks, links pivoted on the second shaft and pivoted to the shanks, and means for rotating the crank shafts.

5. A grain reel of the class described including, in combination, a supporting structure, a rod journaled in the supporting structure, a crank on the rod for rocking the same, a pair of arms having intermediate portions fixed to the rod, a spring engaged with one extremity of each of the arms and the supporting structure, a U-shaped frame, a shaft piercing openings in the sides of the U-shaped frame and openings in the upper portions of the arms, a lever pivoted to one of the arms, a link pivoted to the lever and the frame for rocking the frame in the arms, a reel mechanism rotatable in the extremities of the sides of the frame.

6. A grain reel of the class described including, in combination, a supporting structure, a pair of arms pivoted in the supporting structure, means for adjusting the arms on their pivots, a U-shaped frame journaled between the arms, means for swinging the frame in the arms, and a reel structure journaled between the extremities of the frame.

7. A grain reel of the class described including, in combination, a supporting structure, a pair of arms pivoted in the supporting structure, means for adjusting the arms on their pivots, a U-shaped frame journaled between the arms, means for swinging the frame in the arms, a reel structure journaled between the extremities of the frame, said reel structure comprising a crank shaft, a plurality of shanks journaled on the cranks of the crank shaft, links pivotally mounted in the frame and pivotally engaged with the shanks, and rake elements on the shanks.

In testimony whereof I affix my signature.

THOMAS S. COLLIER.